United States Patent
Telles et al.

(10) Patent No.: US 10,958,534 B2
(45) Date of Patent: Mar. 23, 2021

(54) USER INTERFACES FOR PRESENTING CYBERSECURITY DATA

(71) Applicant: Chronicle LLC, Mountain View, CA (US)

(72) Inventors: Bernardo Malta Leite Telles, Fremont, CA (US); Shapor Naghibzadeh, San Francisco, CA (US); Carey Stover Nachenberg, Manhattan Beach, CA (US)

(73) Assignee: Chronicle LLC, Mountain View, CA (US)

( * ) Notice: Subject to any disclaimer, the term of this patent is extended or adjusted under 35 U.S.C. 154(b) by 144 days.

(21) Appl. No.: 15/792,507

(22) Filed: Oct. 24, 2017

(65) Prior Publication Data

US 2019/0123975 A1 Apr. 25, 2019

(51) Int. Cl.
*H04L 12/24* (2006.01)
*H04L 12/26* (2006.01)
(Continued)

(52) U.S. Cl.
CPC .............. *H04L 41/22* (2013.01); *H04L 41/06* (2013.01); *H04L 43/028* (2013.01); *H04L 43/045* (2013.01); *H04L 43/0823* (2013.01); *H04L 63/0227* (2013.01); *H04L 67/22* (2013.01); *H04L 67/36* (2013.01)

(58) Field of Classification Search
CPC ... H04L 41/22; H04L 63/0227; H04L 43/028; H04L 43/045; H04L 41/06; H04L 67/22; H04L 43/0823; H04L 67/36
See application file for complete search history.

(56) References Cited

U.S. PATENT DOCUMENTS

2004/0042470 A1* 3/2004 Cooper ................ H04L 41/046
370/401
2006/0047807 A1 3/2006 Magnaghi et al.
(Continued)

OTHER PUBLICATIONS

'www.perforce.com'[online] "Helix Threat Detection," copyright 2015 [retrieved on Mar. 2, 2018] Retrieved from Internet: URL<https://www.perforce.com/pdf/helix-threat-detection-product-brief.pdf> 2 pages.
(Continued)

*Primary Examiner* — Arpan P. Savla
*Assistant Examiner* — Haimei Jiang
(74) *Attorney, Agent, or Firm* — Fish & Richardson P.C.

(57) ABSTRACT

Methods, systems, and apparatus, including computer programs encoded on computer storage media, for surfacing anomalous network activity on a user interface. An example method provides, for presentation on a user device, a user interface for analyzing network traffic from a customer network. The user interface is populated with network traffic data from the customer network for display to the user. An interactive first filter that is configurable for filtering network traffic based on prevalence of the destination domains of the network traffic is displayed to the user. A first user input configuring the first filter to a first prevalence value is received. In response, the network traffic data is filtered in the user interface to only include network traffic data that has a destination domain that is less prevalent than the first prevalence value.

20 Claims, 3 Drawing Sheets

(51) Int. Cl.
    *H04L 29/08*     (2006.01)
    *H04L 29/06*     (2006.01)

(56) References Cited

U.S. PATENT DOCUMENTS

| | | | |
|---|---|---|---|
| 2006/0064411 A1* | 3/2006 | Gross | G06F 16/90324 |
| 2007/0094725 A1 | 4/2007 | Borders | |
| 2009/0271349 A1* | 10/2009 | Allen | G06F 16/24565 |
| | | | 706/47 |
| 2012/0084860 A1* | 4/2012 | Cao | H04L 63/1441 |
| | | | 726/23 |
| 2014/0258873 A1* | 9/2014 | Muthu | H04L 43/0817 |
| | | | 715/736 |
| 2016/0219070 A1 | 7/2016 | Vasseur et al. | |

OTHER PUBLICATIONS

Atifi et al. "On correlating network traffic for cyber threat intelligence: A Bloom filter approach," 13$^{th}$ International Conference on Wireless Communications and Mobile Computing Conference, Jun. 26-30, 2017, 6 pages.

Iglesias et al. "Analysis of network traffic features for anomaly detection," Machine Learning, vol. 101 (1-3) Oct. 2015, 26 pages.

\* cited by examiner

USER INTERFACES FOR PRESENTING CYBERSECURITY DATA

BACKGROUND

This specification relates to surfacing anomalous information in a user interface.

Cyber-attacks are very real threats to customer networks. These attacks have the ability to cause damage to network infrastructure and exploit sensitive data. It is critical to quickly identify malicious network traffic in order to protect customer networks from cyber-attacks.

SUMMARY

This specification describes technologies for surfacing anomalous network activity on a user interface.

In general, one innovative aspect of the subject matter described in this specification can be embodied in methods that include the actions of surfacing anomalous network activity on a user interface. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. A user interface can be provided for analyzing network traffic from a customer network. The interface can include one or more filters that are each set to an initial setting. The one or more filters include a first prevalence filter that is set to an initial prevalence filter value. The user interface is populated with search results in the form of network traffic data from the customer network that satisfy an initial search query and the initial setting of the one or more filters. A first user input is received for configuring a first prevalence filter value for the first prevalence filter of the one or more filters. In response to the first user input, the search results that are displayed in the user interface are filtered to only include network traffic data that has a destination domain that is less prevalent than the first prevalence filter value.

The first prevalence filter can be a filter for global prevalence of destination domains of network traffic and the one or more filters further include a second filter that is configurable for filtering network traffic based on customer-specific prevalence of destination domains of the network traffic.

A second user input may be received configuring the second filter to a second prevalence value. In response to the second user input, the network traffic data that is displayed to the user interface is filtered to only include network traffic data for network traffic that has a destination domain with a global prevalence less than the first prevalence value and a customer-specific prevalence that is less than the second prevalence value.

The one or more filters may further include a second filter that is configurable for filtering network traffic based on a first time that a destination domain was queried from the customer network in a specified time frame.

The one or more filters may further include a second filter that is configurable for filtering network traffic based on subdomains of a domain and the specified number of subdomains to include in the domain search.

The user interface may display the filtered results in a timeline. The user interface may display the filtered results in a results list. The user interface may display a search box and a box for date input for a user to input search terms and dates to search network traffic.

Prior to populating the user interface with network traffic data from the customer network for display to the user, search terms may be received from the user. Network traffic data may be searched for traffic data that matches the search terms and the network traffic data from the customer network that satisfies the search terms and the initial setting of the one or more filters is set to display on the user interface.

An indication may be received that indicates that the user has selected a specific item from the displayed results and the user interface can display more information about the selected item in a graph and a summary panel.

The one or more filters may include a second filter that is configurable for filtering network traffic based on a domain destination that is internal to the customer network.

The subject matter described in this specification can be implemented in particular embodiments so as to realize one or more of the following advantages. The system described in this specification surfaces security-relevant telemetry data, such as domain name server queries, in specific ways to show users important information for determining malicious behavior in a network. Many conventional security tools aim to display security-relevant telemetry. However, these tools provide users with a tremendous amount of data, making it difficult for the users to discern the network activities that are indicative of malicious or anomalous activity. In fact, a user using conventional tools may spend hours sorting through data to find anomalous behavior that qualifies as a threat. To effectively find and mitigate network threats, anomalous and malicious activity must be found quickly on the network. These tools often score "badness" of an activity, but do not look at the prevalence of the activity on the network. Therefore, there can be thousands and thousands of "bad" activities that a user has to sort through to find actual threats to the network.

In order to quickly and efficiently identify malicious behavior from a potentially very large amount of network traffic data, the example system of this specification presents filters that allow a user to quickly and efficiently filter the displayed network traffic data to identify events that are anomalous and are most likely to be malicious. In particular, the system, through a user interface, presents the user with filters to filter network activity data based on one or more of customer prevalence, overall prevalence, whether the network traffic represents internal traffic, or the first time that the particular domain was seen on the customer network. These filters are designed to minimize the amount of data that is displayed to the user while maximizing the chances that the data that is displayed represents the most important threats to the network. By filtering out irrelevant data, the system provides users with a user interface that allows the users to identify malicious network behavior in a fast and effective manner.

The combination of filters can help identify lateral movement of bad actors within a customer network. For example, the filters may filter out noise so that network analysts can see lookups to other on-network assets.

Additionally, the filters also allow users to identify new threats by providing information about DNS queries. For example, by seeing that a query for domain badactor.com resolves to IP address 1.2.3.4 and later on that IP address 1.2.3.4 resolves to unknownbadactor.com, the system can infer that unknownbadactor.com is also a bad actor.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system for surfacing anomalous network activity to help users quickly identify malicious network traffic, such as domain name server events, on a customer network. Network traffic refers to the data moving across the customer network. This data is encapsulated into network packets, with each network packet having a source, a destination, and content.

In order to assess threats to a customer network, users query network traffic. The results show network activity satisfying the search criteria. Often, the search results include numerous amounts of data that has to be analyzed. Analysts who analyze customer network traffic can identify malicious network traffic by destination domains since traffic that is suspicious and malicious may have destination domains that are not frequented often on the Internet or not frequented often by other users on the customer network. Conventional user interfaces generally do not have a way to filter network traffic to show only less prevalent destination domains. Therefore, by surfacing such traffic to users, an example user interface improves conventional user interfaces by allowing users to filter out irrelevant data to quickly identify potential sources of malicious activity in a customer network.

Figure 1:
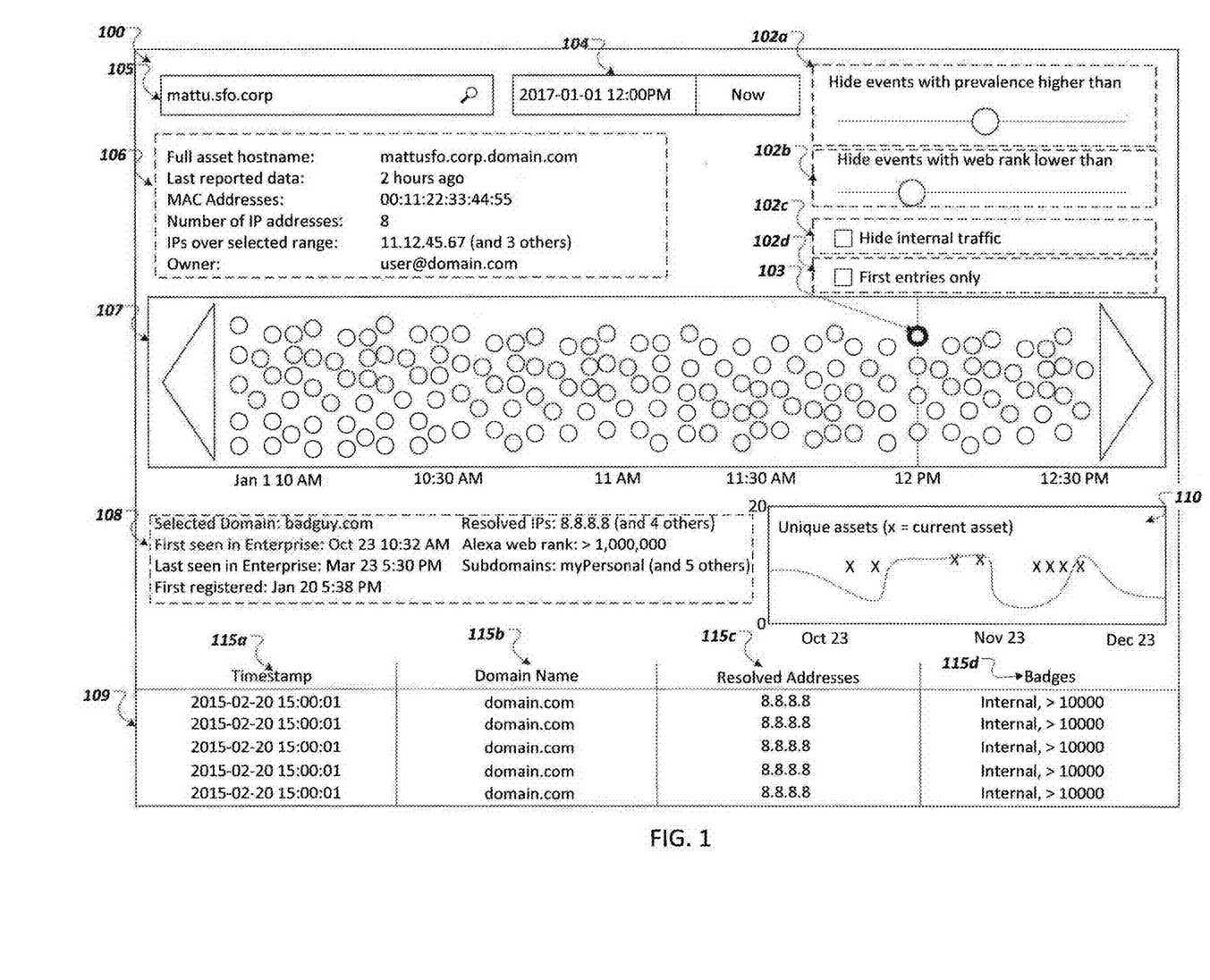
FIG. 1 illustrates an example user interface for surfacing anomalous network activity using user interface filters.

FIG. 1 illustrates the example user interface for surfacing anomalous network activity using user interface filters. An example system for surfacing anomalous network activity, e.g., a system 200 described below with reference to FIG. 2 (200), appropriately programmed, can provide the example user interface allowing users to quickly identify malicious network traffic data. The example user interface can include: (1) a search bar (104, 105); (2) filters for filtering network traffic data (102a-102d); (3) a results list containing search results from a search for network traffic (109); (4) a summary panel that summarizes the results (106); and (5) a timeline that displays the results across time (107).

The user interface, as illustrated, allows a user to enter search terms and a time range to create a search request (104 and 105). Users can search for assets, which are machines or devices internal to the customer network and specific domains. Users may use search terms such as asset hostname, which is the name of a device on the customer network, and asset IP address, which is an IP address specific to the device, to find assets.

For example, a user may search for "10.1.1.1 over the last 24 hours." This search will return network activity for device "10.1.1.1" for the last 24 hours. Additionally or alternatively, users can search for specific domain names using the domain name or an external IP address, which is an address external to the customer network. For example, a user can search for "1.2.3.4 over the last 24 hours." The search will return network activity destined for the external IP address "1.2.3.4" over the last 24 hours. In addition to searching for assets and domains and IP addresses separately, a user may combine search terms so that a user can search for both an asset and a domain at the same time. In addition to search terms, users may also set filters as described below.

As noted above, searching network traffic and asset activity can produce thousands of results. The immense amount of data in the search results makes it difficult for users to quickly and easily identify network threats.

The example user interface therefore provides filters that filter out irrelevant data from the search results on user interface in order to quickly surface actual anomalous activity and assist users in identifying malicious network traffic.

Figure 2:
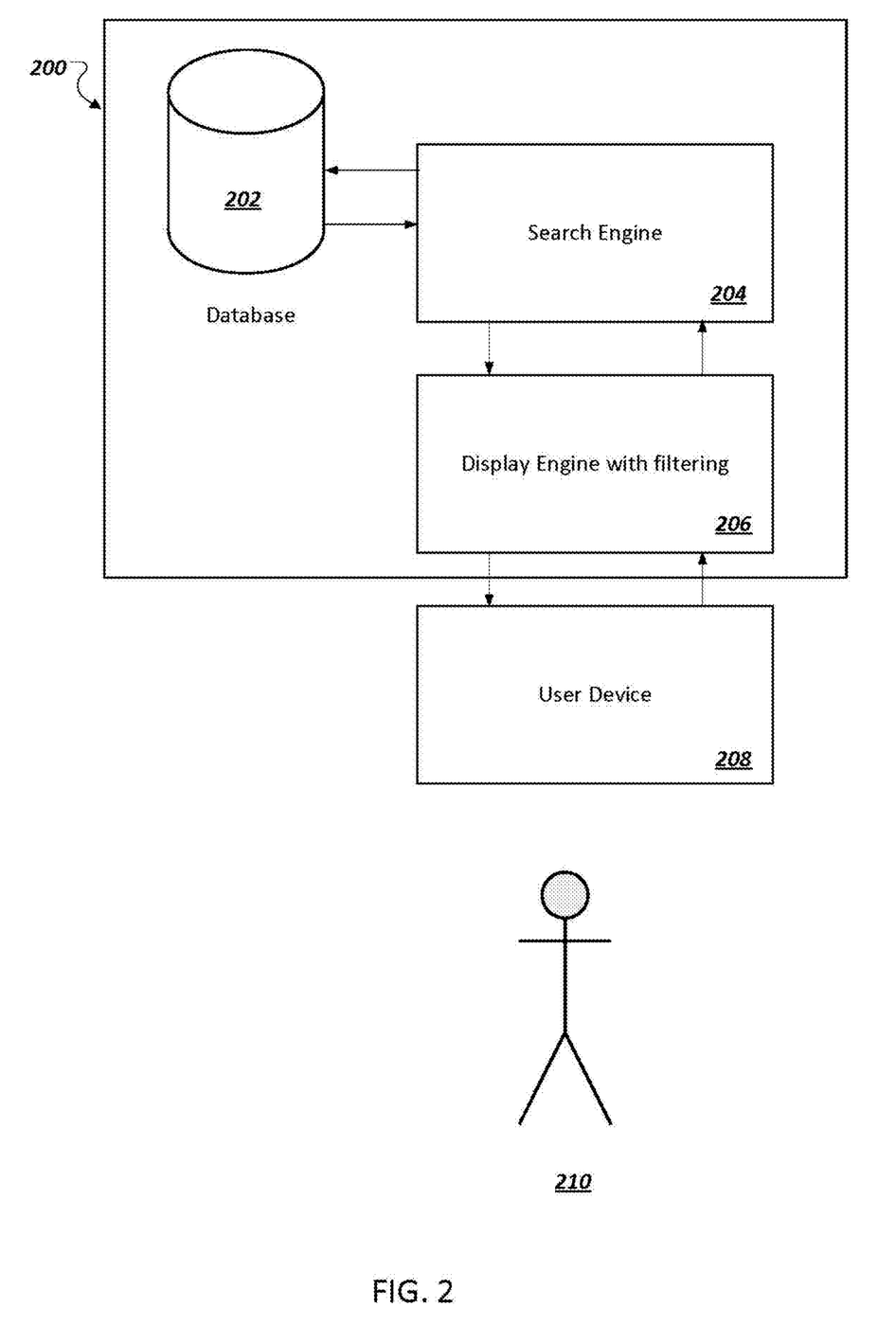
FIG. 2 illustrates an example system for determining malicious network traffic.

The example system 200 sends the search queries with filter values, if the filter values are set, to the search engine, which searches the database and returns network traffic data that satisfies the queries and the filter values.

Examples of user interface filters include: (1) hiding network traffic destined for domains with a customer prevalence greater than a defined amount; (2) hiding network traffic destined for domains with a web prevalence greater than a defined amount; (3) hiding internal network traffic; (4) showing only the first entry of a given destination domain from the searched device; and (5) filtering by either selecting destination subdomains or rolling the subdomains up with the network traffic destination domain.

As illustrated in FIG. 1, the user interface includes a customer prevalence filter for hiding network traffic destined for a domain with a customer prevalence greater than a defined amount (102a). This filter is a user interface element with which a user can interact to set a filter value, a defined amount, for the customer prevalence filter. The filter may be a slider that allows the user to input a defined amount, an input box, a checkbox, or some other user interface element that allows a user to set a value from a set of possible values for the filter.

The defined amount represents the number of times the domain has been queried by unique assets on the customer network. When the filter is set to a filter value, the user interface will only show domains that are queried on average by less than the defined filter value of devices in the customer network per day. For example, if the filter is a slider that is set to 10, the user interface will only show domains that, on average, are queried by less than 10 devices on the customer network on a given day.

The example user interface also includes a global prevalence filter for hiding domains with a web prevalence greater than a defined amount (102b). This filter is a user interface element with which a user can interact to set a filter value for the global prevalence filter. The filter may be a slider that allows a user to define a filter value, an input box, a check box, or some other user interface element that allows a user to set a value. The defined amount represents the web rank of the website of the queried domain based on Alexa ranking, or some other ranking of the global prevalence of websites. When the filter is set to a filter value, the user interface will only show domains that have a web rank that is greater than the defined value. For example, if the filter is a slider that is set to 500,000, the user interface will only show queried domains in the customer network that have a web ranking of greater than 500,000. This global prevalence filter differs from the customer prevalence filter by looking at traffic across the entire Internet whereas the customer prevalence filter only analyzes traffic from the customer network.

The example user interface additionally has a filter for hiding internal traffic. This filter is a user interface element with which a user can interact to set the filter value. This filter may have two options, "on" or "off." This user interface element may be some representation of two choices such as: a toggle, a checkbox, an input box, or a Boolean filter as shown in FIG. 1 (102c). If the filter is "on," the user interface will only show lookups from and destinations to domains external to the customer network.

The example user interface may also allow for filtering on the first entry to a domain. This filter is a user interface element with which a user can interact to set the filter value. This filter may have two options, "on" or "off." This user interface element may be some representation of two choices such as: a toggle, a checkbox, an input box, or a Boolean filter as shown in FIG. 1 (102d). If the filter is "on," the user interface will only show the first time a given domain was queried by the asset for which the user is searching in a given date/time range. The date/time range may be specified by the user using an input box (104) or date pickers which allow the user to choose the start and end date of the range.

Although not illustrated in FIG. 1, the example user interface may also have a filter to filter on subdomains. This filter is a user interface element with which a user can interact to choose whether subdomains should be included in a particular domain search and if so, the user may specify the number of subdomains to be included. For example, if a user searches for "blogspot.com," there are millions of "username.blogspot.com" subdomains. By specifying the number of subdomains to be included or the specific subdomains to include in a search, a user can obtain search results destined to subdomains of the domain.

Users may apply any or all of the filters described above to filter the search results so that anomalous and malicious network activities are easy to identify. Filters can be applied at the time of initial search. For example, the system may populate the user interface with initial values for the filters when the user interface is initially presented on a user device and a user can modify the initial values before submitting an initial search query. Additionally or alternatively, filters can be applied after the search results list has been returned.

When a user performs an asset search, the example user interface displays data, such as DNS event data, for a specific asset or assets. As shown in FIG. 1, the example user interface shows data for the asset "mattu.sfo.corp." The summary panel (106) shows information including: the asset hostname, the recency of asset data, MAC address(es), the number of IP addresses the asset had over the time range; a list of IP addresses that the asset had over the time range, and/or the owner of the asset.

The search results panel (109) includes columns such as: a timestamp of the date/time of the network activity (115a); the domain name accessed (115b); the resolved IP addresses (115c); the IP address that was used to identify the asset; the MAC address that was used to identify the asset; the hostname that was used to identify the asset; and/or badges (115d). Badges may include: customer prevalence, time of the first domain access within the customer network; the internal IP address, which is shown if the domain resolves to an internal IP address; the local IP address, which is shown if a domain resolves to a loopback or link-local IP; the dynamic DNS, which is the domain provided by a dynamic DNS provider; an indication that there is no such domain if DNS lookup failed; and an indication that the domain is blocked if the domain resolves to a customer-configured blocked IP address.

The visualization timeline (107) is a scatter plot of assets over time. In the visualization, the y-axis shows the internal prevalence of the asset and the x-axis shows the currently selected time range. A vertical line represents queries "FOR" the searched asset.

Both the search results (109) and the visualization timeline (107) will be filtered by the filters (102a-d) if any of the filters are set on the user interface.

For multiple assets, the user interface is similar to that of FIG. 1. However, multiple assets are displayed in a single view. The summary panel (106) for multiple assets includes the asset hostnames and time ranges. Time ranges may be overlapping. To help the user easily determine if this overlap is due to an IP change or conflict/data issue, data points on the timeline may be color-coded or use the other visual treatment such as shapes or stroke fill to match the hosts.

In addition to the fields described above in the search panel, the example user interface may also include asset short hostname in the multiple asset interface.

The domain view of the user interface displays all requests for a given domain, i.e., "bad-actor.com." When a user enters into domain view, the summary panel will show information including: the total number of lookups over a time window; the number of IP addresses, which represents the number of assets that looked up the domain; the first and the last time the domain name was seen in the network across all time; subdomains seen across all time; the owner of the domain; when the domain was created, last modified, and when the domain expires; registrant contact for the domain including the name and organization, the country code, the email, and other domain metadata; the public suffix domain; the full searched domain including the first and last time the full searched domain was seen on the customer network, the resolved IP addresses across time; the "badness" of the domain based on data from SafeBrowsing or some other determination of the maliciousness of the domain, subdomains seen across all time; and a the maximum internet popularity rank over the selected time range.

The visualization in the domain view is a scatter plot with assets that queried for the searched domain on the y axis and the timeline on the x axis.

This user interface displays all the domain accesses for multiple domains. This display will show results for searches on multiple domains; a single resolved IP address; multiple resolved IP addresses; and a search that is a mix of resolved IP addresses and domains. The search results will display all the fields in the domain view as well as "domain name," which is the domain name for each domain. The summary panel will be similar to the summary panel for multiple assets and will list the domain names.

This user interface displays all domain accesses resolving to a given external IP address for searches on external IP addresses. The interface will display the same fields in the search result list as the multiple domain view. The summary panel includes: the number of lookups resolving to the IP address; the first time the IP address was seen in the customer network; the list or number of domain names resolving to the IP address; the owner of the IP address; and the geolocation data of the IP address.

When a user clicks on a specific item (103) in the visualization timeline, a graph (110) will display more information about the selected item and a summary panel (108) will display more information about the selected item. In FIG. 1, the selected domain is "badguy.com." Although in the timeline, this domain appears to be an anomaly on Jan. 1, 2017, the graph (110) shows that the first appearance of the domain for the current asset was in October and there have been several times when the current asset has made a domain lookup to "badguy.com" over several months. Therefore, an analyst may conclude that this domain lookup is not anomalous for the particular asset.

As illustrated in FIG. 1, the customer prevalence filter (102a) is a slider set with a current set value and the global prevalence filter (102b) is also a slider set to a current value. The summary (107) displays results that satisfy the set values of the filters. When one of the values of the filters change, the display of the summary of the results will also change.

FIG. 2 illustrates an example system 200 for determining malicious network traffic. The system 200 can be implemented as computer programs on one or more computers in one or more locations, in which the systems, components, and techniques described below can be implemented.

The system 200 includes a display engine 206, a search engine 204, and a database 202. The database 202 stores network traffic data for a particular customer network. The network traffic data is data moving across the customer network from particular devices.

In some implementations, a user device 208 displays the user interface described above to a user 210 so that the user 210 can enter search terms to create a request to search the customer network traffic stored in the database 202. The system 200 searches the database 202 using the search engine 204 and user search criteria to find network traffic data that matches the search criteria. The system then displays the search results to the user that match the search terms.

The display engine 206 can translate the search terms from the search request into a search query understandable by the search engine 204. The display engine 206 can then send the search query to the search engine 204. Other implementations of the system may send the search terms in the form of a search request directly to the search engine 204.

The search engine 204 receives the search request and finds network traffic that matches the search terms from the database containing network traffic 202. If a user has chosen filter values for filters on the user interface during an initial search request, the search engine 204 can use the filter values in its query and find network traffic that matches the filters as well as the search terms from the database. The database contains network traffic from the customer network which is collected from e.g., audit logs or a monitoring system. The example user interface then displays the results of the search on the user device 208.

The example user interface, which may be provided by the display engine 206 to the user device 208, facilitates user assessments of customer network traffic. If a user changes the filter values, but no other search terms, the display engine 206 can receive filter values from a user through the user interface and filter the previously-found search results based on the filter values without sending the filter values to the search engine to perform a new search.

Figure 3:
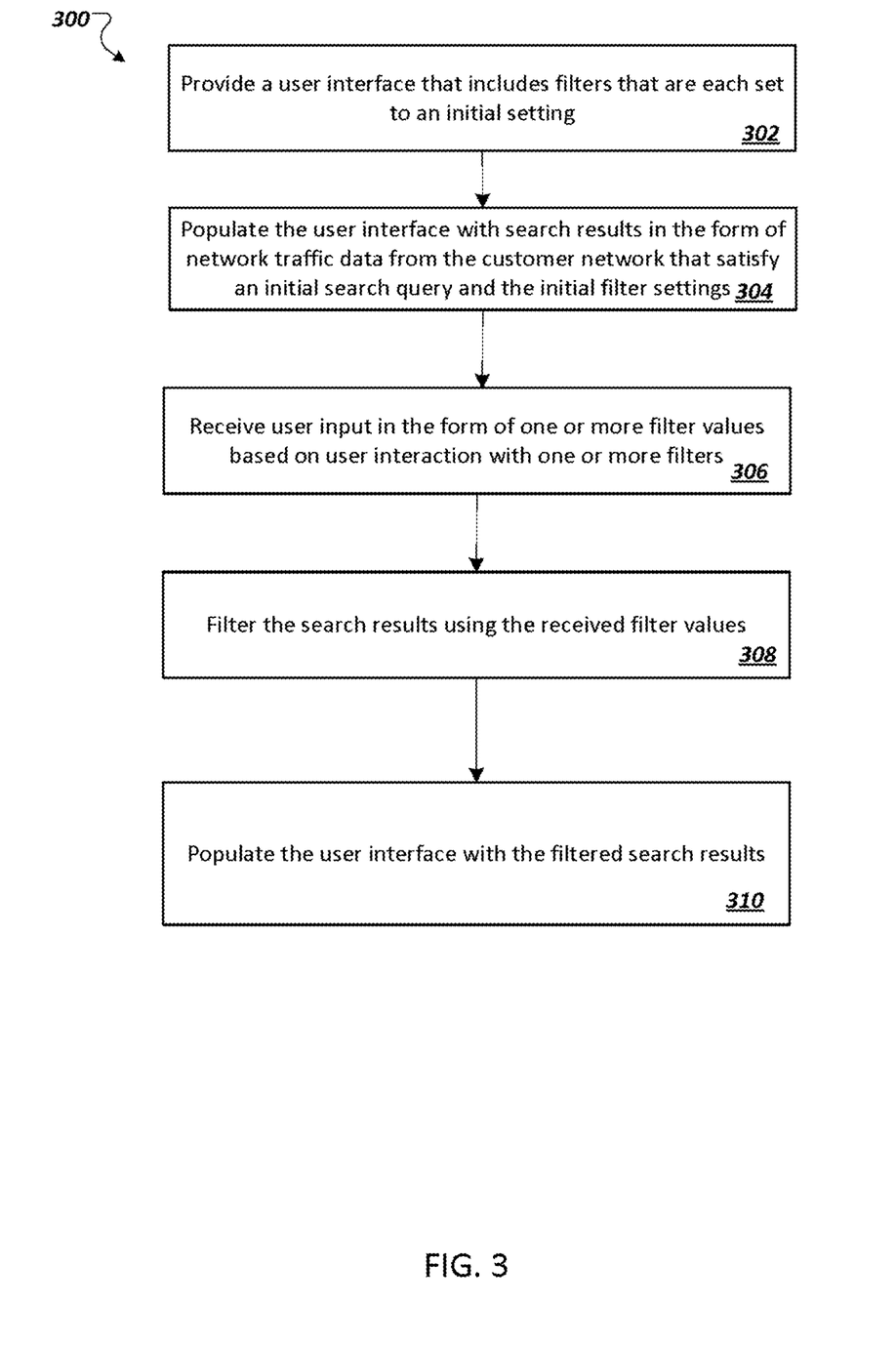
FIG. 3 is a flow diagram of an example process for surfacing anomalous network activity using user interface filters.

FIG. 3 is a flow diagram of an example process 300 for surfacing anomalous network activity, such as domain network server queries, on a user interface. For convenience, the process 300 will be described as being performed by a system of one or more computers, located in one or more locations, and programmed appropriately in accordance with this specification. For example, a system for surfacing anomalous network activity, e.g., the system for surfacing anomalous network activity 200 of FIG. 2, appropriately programmed, can perform the process 300.

The system provides a user interface that includes filters that are each set to an initial setting (302). The filters include some or all of the ones described above with respect to FIG. 1.

The system can then populate the user interface with network traffic data that satisfies an initial search query and the initial filter settings (304).

After populating the user interface with search results, the system can receive user input configuring one or more filter values based on user interaction with one or more filters (306) on the user interface.

The system then filters the search results using the received filter values (308). For example, when the user input changes the value for the filter defining customer network prevalence, the system provides updated search results that include domains that are queried on average by less than the defined filter value of devices in the customer network per day. When the user input changes the value for the filter defining web prevalence, the system provides updated search results that are for domains that are ranked higher than the defined filter value on the web.

The system then populates the user interface with the filtered search results (310). By providing the filters described above, the example user interface allows users to filter search results in order to quickly identify malicious traffic.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method for surfacing anomalous network activity on a user interface, the method comprising: providing, for presentation on a user device, a user interface for analyzing network traffic from a customer network, the interface including one or more filters that are each set to an initial setting, the one or more filters include a first prevalence filter that is set to an initial prevalence filter value; populating, for display to the user, the user interface with search results in the form of network traffic data from the customer network that satisfy an initial search query and the initial setting of the one or more filters; receiving a first user input configuring a first prevalence filter value for the first prevalence filter of the one or more filters; and in response to the first user input, filtering the search results that are displayed in the user interface to only include network traffic data that has a destination domain that is less prevalent than the first prevalence filter value.

Embodiment 2 is the method of embodiment 1 wherein the first prevalence filter is a filter for global prevalence of destination domains of network traffic and the one or more filters further include a second filter that is configurable for filtering network traffic based on customer-specific prevalence of destination domains of the network traffic.

Embodiment 3 is the method of embodiment 2, further comprising: receiving a second user input configuring the second filter to a second prevalence value; and in response to the second user input, filtering the network traffic data that is displayed to the user interface to only include network traffic data for network traffic that has a destination domain that has a global prevalence less than the first prevalence value and a customer-specific prevalence that is less than the second prevalence value.

Embodiment 4 is the method of any one of embodiments 1 through 3, wherein the one or more filters further include a second filter that is configurable for filtering network traffic based on a first time that a destination domain was queried from the customer network in a specified time frame.

Embodiment 5 is the method of any one of embodiments 1 through 4, wherein the one or more filters further include a second filter that is configurable for filtering network traffic based on subdomains of a domain and the specified number of subdomains to include in the domain search.

Embodiment 6 is the method of any one of embodiments 1 through 5 further comprising: displaying, on the user interface, the filtered results in a timeline.

Embodiment 7 is the method of any one of embodiments 1 through 6, further comprising: displaying, on the user interface, the filtered results in a results list.

Embodiment 8 is the method of any one of embodiments 1 through 7, further comprising: displaying, on the user interface, a search box and a box for date input for a user to input search terms and dates to search network traffic.

Embodiment 9 is the method of any one of embodiments 1 through 8, further comprising: prior to populating the user interface with network traffic data from the customer network for display to the user, receiving search terms from the user; searching for network traffic data that matches the search terms; and setting the network traffic data from the customer network that satisfies the search terms and the initial setting of the one or more filters as the network traffic data to display on the user interface.

Embodiment 10 is the method of any one of embodiments 1 through 9, further comprising: receiving an indication that a user has selected a specific item from the displayed results; and displaying, on the user interface, more information about the selected item in a graph and a summary panel.

Embodiment 11 is the method of any one of embodiments 1 through 10, wherein the one or more filters further include a second filter that is configurable for filtering network traffic based on a domain destination that is internal to the customer network.

Embodiment 12 is a system comprising one or more computers; and one or more storage devices storing instructions that are operable, when executed by one or more computers, to cause the one or more computers to perform the method of any one of the embodiments 1 through 11.

Embodiment 13 is one or more non-transitory computer-readable storage mediums comprising instructions stored thereon that are executable by a processing device and upon such execution cause the processing device to perform the method of any one of the embodiments 1 through 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for surfacing anomalous network activity on a user interface, the method comprising:
    providing, for presentation on a user device, a user interface for analyzing network traffic from a customer network, the interface including one or more filters that are each set to an initial setting, the one or more filters include a first prevalence filter that is set to an initial prevalence filter value that defines a number of times a particular destination domain has been queried by unique assets on the customer network;
    populating, for display to the user, the user interface with search results in the form of network traffic data from the customer network that satisfy an initial search query and the initial setting of the one or more filters, the user interface with the search results comprising:
        a plot of domain accesses over a time period along a time axis, wherein for each time increment in the plot along the axis, a selectable item represents a particular unique asset that has queried a particular destination domain on the customer network less times than the initial prevalent filter value;
    receiving a first user input configuring a first prevalence filter value for the first prevalence filter of the one or more filters; and
    in response to the first user input, filtering the search results that are displayed in the user interface to only include network traffic data for each destination domain that has been queried by unique assets on the customer network less times than the first prevalence filter value;
    wherein a selection of one of the selectable items in the plot of domain accesses results in a display of the following in the user interface and concurrently with the filters, search results, and plot of domain accesses over time:
        a display of information specifying the particular destination domain to which the selectable item represents;

a timeline plot that represents when the particular destination domain was accessed by the particular unique asset; and a summary panel that includes a rank of the particular destination domain relative to other destination domains, and times when the particular destination domain was first seen in the customer network and last seen in the customer network.

2. The computer-implemented method of claim 1, wherein the first prevalence filter is a filter for global prevalence of destination domains of network traffic and the one or more filters further include a second filter that is configurable for filtering network traffic based on customer-specific prevalence of destination domains of the network traffic.

3. The computer-implemented method of claim 2, further comprising:

receiving a second user input configuring the second filter to a second prevalence value; and in response to the second user input, filtering the network traffic data that is displayed to the user interface to only include network traffic data for network traffic that has a destination domain that has a global prevalence less than the first prevalence value and a customer-specific prevalence that is less than the second prevalence value.

4. The computer-implemented method of claim 1, wherein the one or more filters further include a second filter that is configurable for filtering network traffic based on a first time that a destination domain was queried from the customer network in a specified time frame.

5. The computer-implemented method of claim 1, wherein the one or more filters further include a second filter that is configurable for filtering network traffic based on subdomains of a domain and the specified number of sub-donnains to include in the domain search.

6. The computer-implemented method of claim 1, further comprising:

displaying, on the user interface, the filtered results in a timeline.

7. The computer-implemented method of claim 1, further comprising:

displaying, on the user interface, the filtered results in a results list.

8. The computer-implemented method of claim 1, further comprising:

displaying, on the user interface, a search box and a box for date input for a user to input search terms and dates to search network traffic.

9. The computer-implemented method of claim 1, further comprising, prior to populating the user interface with network traffic data from the customer network for display to the user, receiving search terms from the user;
searching for network traffic data that matches the search terms; and
setting the network traffic data from the customer network that satisfies the search terms and the initial setting of the one or more filters as the network traffic data to display on the user interface.

10. The computer-implemented method of claim 1, further comprising:

receiving an indication that a user has selected a specific item from the displayed results; and
displaying, on the user interface, more information about the selected item in a graph and a summary panel.

11. The computer-implemented method of claim 1, wherein the one or more filters further include a second filter that is configurable for filtering network traffic based on a domain destination that is internal to the customer network.

12. A system comprising:
one or more computers; and
one or more storage devices storing instructions that are operable, when executed by one or more computers, to cause the one or more computers to perform operations comprising:

providing, for presentation on a user device, a user interface for analyzing network traffic from a customer network, the interface including one or more filters that are each set to an initial setting, the one or more filters include a first prevalence filter that is set to an initial prevalence filter value that defines a number of times a particular destination domain has been queried by unique assets on the customer network;

populating, for display to the user, the user interface with search results in the form of network traffic data from the customer network that satisfy an initial search query and the initial setting of the one or more filters, the user interface with the search results comprising:

a plot of domain accesses over a time period along a time axis, wherein for each time increment in the plot along the axis, a selectable item represents a particular unique asset that has queried a particular destination domain on the customer network less times than the initial prevalent filter value;

receiving a first user input configuring a first prevalence filter value for the first prevalence filter of the one or more filters; and in response to the first user input, filtering the search results that are displayed in the user interface to only include network traffic data for each destination domain that has been queried by unique assets on the customer network less times than the first prevalence filter value;

wherein a selection of one of the selectable items in the plot of domain accesses results in a display of the following in the user interface and concurrently with the filters, search results, and plot of domain accesses over time:

a display of information specifying the particular destination domain to which the selectable item represents;

a timeline plot that represents when the particular destination domain was accessed by the particular unique asset; and a summary panel that includes a rank of the particular destination domain relative to other destination domains, and times when the particular destination domain was first seen in the customer network and last seen in the customer network.

13. The system of claim 12, wherein the first prevalence filter is a filter for global prevalence of destination domains of network traffic and the one or more filters further include a second filter that is configurable for filtering network traffic based on customer-specific prevalence of destination domains of the network traffic.

14. The system of claim 13, wherein the operations further comprise:

receiving a second user input configuring the second filter to a second prevalence value; and in response to the second user input, filtering the network traffic data that is displayed to the user interface to only include network traffic data for network traffic that has a destination domain that has a global prevalence less than the first prevalence value and a customer-specific prevalence that is less than the second prevalence value.

15. The system of claim 12, wherein the one or more filters further include a second filter that is configurable for filtering network traffic based on a first time that a destination domain was queried from the customer network in a specified time frame.

16. The system of claim 12, wherein the one or more filters further include a second filter that is configurable for filtering network traffic based on subdomains of a domain and the specified number of subdomains to include in the domain search.

17. The system of claim 12, wherein the operations further comprise:
displaying, on the user interface, the filtered results in a timeline.

18. The system of claim 12, wherein the operations further comprise:
displaying, on the user interface, the filtered results in a results list.

19. The system of claim 12, wherein the operations further comprise:
displaying, on the user interface, a search box and a box for date input for a user to input search terms and dates to search network traffic.

20. One or more non-transitory computer-readable storage mediums comprising instructions stored thereon that are executable by a processing device and upon such execution cause the processing device to perform operations comprising:
providing, for presentation on a user device, a user interface for analyzing network traffic from a customer network, the interface including one or more filters that are each set to an initial setting, the one or more filters include a first prevalence filter that is set to an initial prevalence filter value that defines a number of times a particular destination domain has been queried by unique assets on the customer network;
populating, for display to the user, the user interface with search results in the form of network traffic data from the customer network that satisfy an initial search query and the initial setting of the one or more filters, the user interface with the search results comprising:
a plot of domain accesses over a time period along a time axis, wherein for each time increment in the plot along the axis, a selectable item represents a particular unique asset that has queried a particular destination domain on the customer network less times than the initial prevalent filter value;
receiving a first user input configuring a first prevalence filter value for the first prevalence filter of the one or more filters; and
in response to the first user input, filtering the search results that are displayed in the user interface to only include network traffic data for each destination domain that has been queried by unique assets on the customer network less times than the first prevalence filter value;
wherein a selection of one of the selectable items in the plot of domain accesses results in a display of the following in the user interface and concurrently with the filters, search results, and plot of domain accesses over time:
a display of information specifying the particular destination domain to which the selectable item represents;
a timeline plot that represents when the particular destination domain was accessed by the particular unique asset; and
a summary panel that includes a rank of the particular destination domain relative to other destination domains, and times when the particular destination domain was first seen in the customer network and last seen in the customer network.

\* \* \* \* \*